May 21, 1968   E. E. COLBY ET AL   3,384,494
PROCESS FOR PREPARING PASTRY CRUST MIXES
Filed April 15, 1965   2 Sheets-Sheet 1

INVENTORS
Edward E. Colby
August Kokal, Jr.
BY
ATTORNEY

May 21, 1968  E. E. COLBY ET AL  3,384,494

PROCESS FOR PREPARING PASTRY CRUST MIXES

Filed April 15, 1965  2 Sheets-Sheet 2

INVENTORS
Edward E. Colby
August Kokal, Jr.

BY *Thomas J. Flaherty*

ATTORNEY

3,384,494
PROCESS FOR PREPARING PASTRY CRUST MIXES

Edward E. Colby, Cincinnati, and August Kokal, Jr., Springdale, Ohio, assignors to The Procter & Gamble Company, Cincinnati, Ohio, a corporation of Ohio
Filed Apr. 15, 1965, Ser. No. 448,313
10 Claims. (Cl. 99—94)

ABSTRACT OF THE DISCLOSURE

Preparation of a dry-free flowing pastry crust mix wherein a shortening composition having an SCI value of about 12 to 17 at 70° F. is firmed to a penetration value of about 50 to 120 mm./10, formed into pieces retaining their crystalline structure, mixed with flour in a high and subsequently low holdup mixer to produce a mix comprising discrete lumps of shortening.

---

This invention relates to a process for preparing pastry crust mixes which can be formed into dough simply by admixing aqueous liquid, such as water, milk or the like.

The present mixes comprise flour and shortening. They are dry and free-flowing and can be easily poured or otherwise removed from their container. The term "dry" is used herein to denote the apparent absence of water. A "dry" mix can, however, contain up to about 10% by weight moisture which is present principally in the flour ingredient. The term "free-flowing" denotes a pourable quality.

Pastry crust doughs are ordinarily prepared in a two-step process. In the first of these steps, shortening and flour are blended until a substantially uniform shortening-flour mixture is achieved. In the second of these steps, water is added to the dry mix resulting from the first step and this combination of ingredients is mixed until the water is absorbed by the flour. This invention is particularly concerned with the shortening and with the first of these steps. It provides a dry mix which is adapted to be processed through the second step in order to provide a dough that is suitable for baking to yield a finished pastry crust.

The various crust properties affected by the shortening or by the combining and mixing operations of step one include tenderness (vis-a-vis toughness) and flakiness (vis-a-vis mealiness). As used herein the term "tenderness" denotes ease of crust breakage under shear and is opposed to the term "toughness." The term "flakiness' is used herein to denote the degree to which crusts are composed of thin, laminar, friable sheets of baked dough. When a flaky crust is broken, these sheets are apparent in cross-section. On the other hand, a mealy crust exhibits little laminar structure.

Tenderness depends in part upon the consistency and distribution of the shortening ingredient in the mix. In general, the softer the shortening, the more tender the crust. In all cases, sufficient greased flour (that is, flour which is "wetted" by or has absorbed shortening) must be uniformly distributed through the mix to preclude formation of excess paste on water addition; otherwise, on baking, such a combination of ingredients provides a crust with tough areas.

Flakiness, a crust characteristic esteemed by housewives and bakers, is dependent upon the particle size and distribution of the shortening in the mix, which in turn is dependent upon the consistency of the shortening ingredient and upon the type and degree of mixing. A mix capable of producing a flaky crust can be obtained by mixing plastic shortening together with flour for a period of time just sufficient to reduce the shortening to small lumps with a cutting rather than a smearing type of mixing. On the other hand, if the shortening and flour are thoroughly blended to form greased flour exclusively, the mix provides a mealy crust. Soft shortenings such as those usually needed for tender crusts increase the chance of formation during mixing of excess greased flour, thereby forming a mix that provides a mealy crust. Extended or intense mixing can also cause an excess of greased flour.

Thus, the preparation of a dry mix that provides a crust which is both tender and flaky involves problems of shortening selection and mixing. Small scale preparation of such a mix by the housewife is possible with careful mixing using any of a number of commercially available plastic shortenings. However, the problems of shortening selection and mixing have not heretofore been entirely solved for large scale production of pastry crust mixes involving rapid, continuous or semi-continuous processing of the mix ingredients. Conventional commercial processes tend to produce dry mixes that yield tough and/or mealy crusts.

Accordingly, it is an object of this invention to provide a process for the rapid, continuous or semi-continuous preparation of dry mixes which provide pastry crusts that are both tender and flaky.

It is another object of this invention to provide a process in which a particular plastic shortening is blended with flour in a novel combination of processing operations to provide dry mix.

These and other objects will be apparent after referring to the following specification and drawings, the details of which are hereinafter more fully described.

Figure 1:
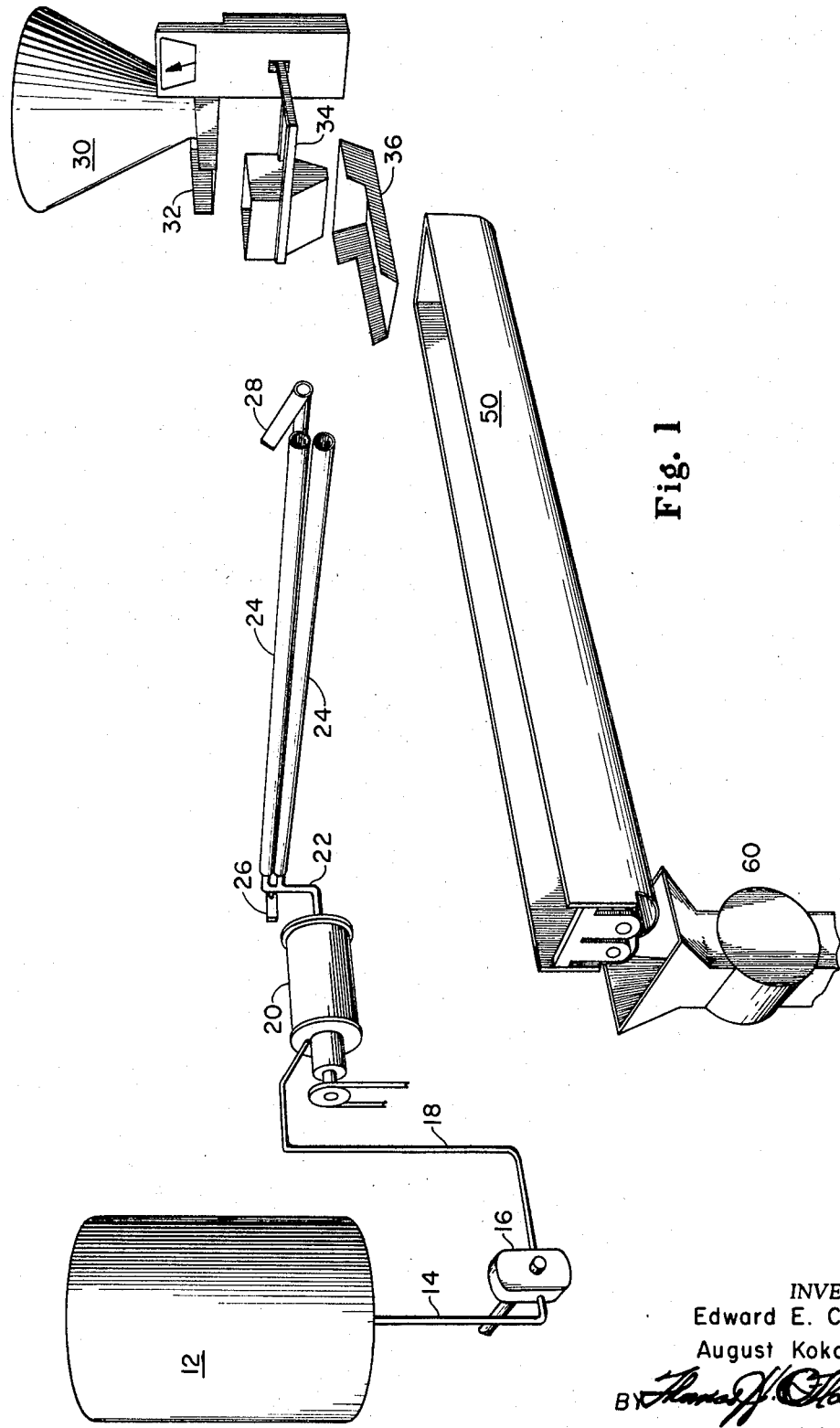
FIGURE 1 is a perspective view of a portion of the processing apparatus utilized and more fully described in Example I, which illustrates a preferred embodiment of this invention.

It has been discovered that by employing pieces in a certain degree of subdivision of a particular shortening composition that is normally soft but is temporarily maintained in firm condition during mixing and dividing the mixing step into two stages, a low intensity, long dwell time stage followed by a high intensity short dwell time stage, a delicate compromise can be achieved in the desirable properties of the ultimate crust, combining tenderness, normally incidental to soft shortening and severe mixing of flour and shortening, with flakiness, normally incidental to discrete shortening particles and gentle mixing.

In the present process a particular shortening composition is temporarily firmed and formed into pieces having a particular configuration. These pieces of firmed shortening are mixed with flour and optional dry ingredients in a two-stage continuous mixing step. When the required degree of mixing is achieved, the resultant mix is preferably cooled before being packaged.

One of the features that distinguishes this process from those of the prior art is the consistency of the shortening. The shortening must be in a firm but plastic state which is achieved by temporary firming under controlled conditions. This consistency during mixing is essential. If the shortening becomes too hard, the gross uniform distribution of shortening lumps that is necessary for a flaky crust is achieved only with great difficulty; excessively hard shortenings produce substantially no greased flour and therefore provide a crust with tough areas. If the shortening is too soft, too large a proportion of greased flour results even with slight mixing and a mealy crust is likely to result. The conventional commercial processes use either harder or softer shortenings than are required in the present process.

The present process does not negate one benefit derived from using soft shortening; namely, tenderness. The normal shortening consistency and the firming process described herein are such that the shortening after mixing is converted in the mix during storage to a softer plastic state. As a result, tenderness is enhanced.

In addition to the advantages described above, this process in a preferred embodiment solves a storage stability problem. The preferred process provides a mix having the proper shortening distribution and consistency for a tender, flaky crust even after exposure of the mix to abnormally high temperatures over periods of time normally encountered during warehouse storage, transportation and shelf life in both stores and in the consumer's home. In fact, this preferred process can provide a mix that retains proper shortening distribution and consistency characteristics even after exposure to extreme conditions, e.g., 100° F. for from four to six weeks. The key to the stability of the mix is the high temperature resistance of the shortening itself and, more importantly, the degree and type of shortening-flour mixing which is employed.

The details of this process will now be explained with reference to the essential features and to the advantages set forth above.

A shortening composition having a Solids Content Index (SCI) value at 70° F. ranging from about 12 to about 17 is used herein. SCI values are measured herein by the dilatometric method of Fulton, Lutton and Wille, JAOCS, 31, 98 (1954).

This shortening is temporarily firmed to a harder plastic state as will hereafter be described that makes it suitable for further processing. It is converted in the required manner during mix storage to a softer plastic state.

In addition to the described SCI value at 70° F., a shortening composition which has an SCI value at 92° F. ranging from about 8 to about 14, an SCI value at 105° F. ranging from about 4 to about 9, an I.V. ranging from about 78 to about 88 and a melting point ranging from about 115° F. to about 125° F. is preferred since it is high temperature resistant and therefore provides an extremely stable mix.

In general, the above shortening compositions comprise from about 5% to about 10% hard stock and from about 90% to about 95% base stock. All percentages and parts stated herein are by weight unless otherwise specified.

Hard stocks suitable for use in these shortening compositions are normally solid substantially fully saturated fatty triglycerides. These triglycerides include substantially completely hydrogenated cottonseed oil, soybean oil, rapeseed oil, palm oil and tallow. For example, cottonseed oil hydrogenated to an iodine value of less than about 12 can be used herein as hard stock.

The base stock preferred for use in the present shortening composition is any liquid glyceride vehicle having an SCI value at 70° F. ranging from about 4.5 to about 10 and an iodine value ranging from about 85 to about 92. Base stocks having SCI values above about 20 at 70° F. and iodine values below about 50 provide a shortening composition which imparts a waxy taste to the pastry crust.

Liquid triglyceride oils suitable for use as base stocks include, for example, those derived from soybean oil, cottonseed oil, corn oil, safflower oil, wallflower seed oil, sunflower seed oil, and peanut oil. A liquid triglyceride mixture of soybean oil and cottonseed oil, in weight ratios of about 15:1 to about 1:5 soybean oil to cottonseed oil, having an SCI value at 70° F. ranging from about 6 to about 8.5 and an iodine value of about 88 is especially preferred.

In addition to the above described hard stock and base stock, a shortening composition may contain about 30 p.p.m. of butylhydroxyanisol or other conventional antioxidant and about 38 p.p.m. of a coloring agent such as carotene to provide an orange-yellow color to the crust.

In processing the above-described shortening composition in the present process, it is first temporarily firmed to a penetration value at mixing temperature ranging from about 50 mm./10 (tenths of a millimeter) to about 120 mm./10, preferably about 70 mm./10, before further processing to insure proper mixing to provide a dry mix that produces a tender, flaky crust. Penetrations are measured with the aid of an A.S.T.M. type penetrometer employing a cone-shaped stainless steel needle. The needle and its shaft weigh 47 grams and drop 20 mm. onto the sample surface. The taper on the cone is 8° with its vertical axis. Mixing temperature is the temperature of the shortening entering the first mixing stage.

The preferred method for temporarily firming the shortening composition for further processing comprises the steps of supercooling the shortening composition which has previously been melted, and allowing the supercooled shortening composition to crystallize at room temperature and at rest and out of contact with the supercooling medium, to a condition of maximum firmness at mixing temperature.

In this preferred firming method, the shortening is first melted and the melt supercooled to a temperature ranging from about 35° F. to about 70° F., preferably to about 55° F., by rapid pumping through a scraped wall heat exchanger. The supercooled shortening is allowed to crystallize at room temperature and at rest, for example, in a mold, or on a moving belt or in a pipe. For example, the shortening composition emerging from the scraped wall heat exchanger is pumped into a pipe having a length to diameter ratio ranging from about 50:1 to about 100:1 wherein it is allowed to crystallize at room temperature and at rest until its penetration reaches about 70 mm./10 whereupon it is pumped from the pipe. Pipes of different diameters and lengths can be used as well as a plurality of pipes depending upon the quantity of shortening needed in the process and upon the desirability of fully continuous operation.

Another method for temporarily firming a shortening composition for further processing in this invention comprises the steps of (1) melting the shortening composition, (2) supercooling the melted shortening composition, (3) allowing the supercooled shortening composition to crystallize in a dynamic state, (4) tempering the partially crystallized shortening composition at rest, and (5) cooling the tempered shortening composition. Allowing crystallization in a dynamic state produces a shortening composition which is less firm than that produced by allowing crystallization to occur at rest. The tempering has a permanent softening effect and also appears to produce a crystal network of lesser hardness and rigidity. The cooling is to increase the solids content to impart the proper temporary firmness to the tempered shortening for the mixing operations.

In the dynamic crystallization method of temporary firming, the shortening is first melted, and the melt supercooled to a temperature ranging from about 55° F. to about 70° F. in a scraped wall heat exchanger. The supercooled shortening composition is allowed to partially crystallize at room temperature in dynamic state, that is, while it is being mildly agitated, for from about four to about eight minutes in a picker box. The partially crystallized shortening composition is discharged to another container and tempered at rest at 80° F. to 90° F. for from about eight hours to about two days. The tempered shortening composition is then firmed to a penetration ranging from about 50 mm./10 to about 120 mm./10 by cooling to a temperature ranging from about 35° F. to about 70° F.

The shortening composition, temporarily firmed for example by one of the above methods, is formed into pieces which have structural integrity and having their smallest dimension not exceeding about one-half inch. The forming may be achieved by any method which substantially leaves intact the crystalline structure of the temporarily firmed shortening composition. The phrase "pieces which have structural integrity" is used herein to denote shortening pieces which are firm enough to retain their shape under normal conditions. The structural integrity and smallest dimension limitations are essential to insure that shortening lumps of the proper size and proportion form during the shortening-flour mixing operations. The maximum limitations on the other not specified shortening piece dimensions are defined by the size of the mixers used in the mixing operations. In general, in practice, these other dimensions ordinarily range from about one-fourth to about 16 inches.

Preferably, the temporarily firmed shortening composition is sliced into thin slabs not exceeding about one-fourth inch in thickness; in the optimum process the slicing is done by a rotating blade as the shortening is pumped from a hold tube after crystallization at rest. As used herein the term "slab" denotes a brittle, more or less rigid particle having length and width or diameter dimensions which are substantially greater than the thickness.

The pieces of shortening in temporarily firmed state are mixed with flour and optional dry ingredients in a series of essential mixing steps. The shortening composition comprises about 25% to about 45% of the ingredients which are initially mixed. The flour to shortening ratio ranges from about 1.2:1 to about 2.3:1. Optional dry ingredients can be added together with the flour to provide specific effect. For example, sugar can be added in amounts ranging up to about 8% by weight of the flour to provide flavor and crust color. Salt can be added in amounts ranging up to about 4% by weight of the flour to provide flavor. Minor amounts of whey solids can be added to provide crust color and minor amounts of propionates or similar compounds can be included to retard mold growth.

The preferred proportions of ingredients to be mixed in the series of mixing steps are as follows: shortening, 38.5 parts; flour (on a 14% moisture-containing basis), 60 parts; salt, 1.5 parts; all by weight.

The pieces of shortening are first gently and grossly mixed with the above-described proportions of dry ingredients in a low intensity, high holdup (long dwell time) continuous mixer. High holdup continuous mixers are discussed in Perry's Chemical Engineers' Handbook, 4th ed., McGraw-Hill, 1963, at pages 21–43. These low intensity mixers supply a small amount of power to a large amount of material. These mixers contain agitating mechanisms for supplying shearing and smearing forces to the ingredients and conveying mechanisms for moving the ingredients through the mixer. As a result of the shearing forces, the shortening pieces are reduced in size; as a result of the smearing forces, part of the shortening and part of the flour are intimately mixed to form greased flour. The mixing produces a mixture of substantially shortening-free flour, lumps of shortening and greased flour. The resultant mixture is grossly homogeneous.

The ingredients are mixed in the high holdup mixer for about one to about 15 minutes until the largest shortening particles range from about one thirty-second to about one-half inch in diameter. This mixing period is sufficiently long so that the mix is not dusty; the mixing period is short enough so that the mix is free-flowing, is not sticky and does not contain dough-like lumps. Ordinarily, this mixing is carried out at room temperature.

In the preferred high holdup mixing step a twin-shaft continuous shallow paddle mixer is employed. Twin-shaft mixers ranging from about two to about 20 feet in length are satisfactory. The shafts are counter-rotated each turning at speeds ranging from about 20 to about 150 r.p.m. The paddles extend from each shaft. They are located at intervals along the length of the shafts and are synchronized to intermesh in the central portion of the mixer. Some of these paddles are pitched at a slight angle to the shaft; the balance of the paddles are unpitched and extend perpendicularly from the shafts at an angle of zero degrees to a plane perpendicular to the shaft axis. The pitched paddles provide conveying and transporting means for the mixed material. The unpitched paddles provide size-reduction and smearing action.

Other high holdup continuous mixers which can be adapted for use herein include, for example, the following continuous mixers: single-shaft canted paddle mixers, interrupted flight ribbon mixers and counter-rotating concentric-shaft ribbon slash paddle mixers.

The mix emerging from the high holdup mixer is fed into a high intensity, low holdup (short dwell time) continuous mixer. Low holdup continuous mixers are discussed in Perry's Chemical Engineers' Handbook, 4th ed., McGraw-Hill, 1963, at pages 21–43. These high intensity mixers supply a large amount of power to a small quantity of material. These mixers contain mechanisms for supplying shearing, smearing and especially impacting forces to the ingredients. As a result of the shearing forces, at least some of remaining shortening pieces are reduced in size. As a result of the smearing forces, some of the remaining free shortening and some of the remaining substantially shortening-free flour are intimately mixed to form more greased flour.

The ingredients are mixed in the high intensity, low holdup mixer for from about one to about five seconds. This mixing produces a grossly homogeneous mixture comprising from about 10% to about 50% greased flour and from about 5% to about 25% shortening in the form of discrete lumps not exceeding about one-half inch in diameter; and substantially shortening-free flour. At least about 10% greased flour is necessary to guard against excess paste formation and resulting tough crust areas. More than about 50% greased flour provides a mealy crust. From about 5% to about 25% shortening lumps are necessary for a flaky crust. Optional dry ingredients and moisture are considered part of the flour, including the flour in the greased flour, herein.

In the preferred high intensity, low holdup mixing step a variable speed impact mill and more especially a hammer mill is employed. In general, from about 2000 to about 15,000 impacts are supplied to each pound of mix. Mill speeds ranging from about 800 to about 2000 r.p.m. are ordinarily employed. In the hammer mill the ingredients are fed onto a set of rotating blades whereby some of the shortening particles are reduced in size, more greased flour is formed and the mix ingredients are subjected to impacting forces.

The high intensity low holdup mixing step allows precise control over the final dry mix composition and over the shortening and flour distribution within the mix.

The combination of the above two types of mixing is essential to the attainment of the desired resulting mix and the compensation for the omission of one of the types of mixing by some adjustment in the duration of the other is not possible. If the high intensity, low holdup mixing step is omitted, the resultant dry mix will contain too little greased flour. If the high intensity, low holdup mixing step is omitted and the high holdup mixing step lengthened, there will not be a sufficient amount of shortening lumps of proper size and there will be an improper amount of greased-flour in the final mix. If the high holdup mixing step is omitted, mixing will be totally inadequate and incomplete, the shortening slabs will not be sufficiently reduced in size and substantially no greased flour will be formed. If the high holdup mixing step is omitted and low holdup mixer residence time lengthened, the dry mix will contain so much greased flour that a solid block of mix is likely to be formed during normal shelf-life storage and, in any case, the dry mix will produce a mealy crust.

The dry mix emerging from the high intensity, low holdup mixer is preferably immediately cooled below about 60° F. This cooling removes heat supplied to the mix in the mixing operations as mixing energy and thereby prevents even slight further flour-greasing and insures quality control. Dry Ice or liquid carbon dioxide can be used for cooling. The liquid carbon dioxide is simply sprayed onto the emerging mix.

The mix having been processed can be used immediately to form dough. However, a more tender crust is achieved if the mix is used after the temporarily firmed shortening in the mix softens. The shortening softens to a penetration ranging from about 120 mm./10 to about 300 mm./10 within about one day after mixing is complete. The exact penetration achieved during the one-day post-mixing period depends upon the particular shortening composition present and upon the degree of temporary firming to which it has been subjected. For example, a shortening composition which was temporarily firmed to a penetration of about 120 mm./10 can soften to a higher penetration, e.g., 200 mm./10, within the one-day post-mixing period.

The housewife adds a conventional amount of water to this dry mix and with conventional techniques forms a pastry dough. Ordinarily added water comprises 10% to 25% of the wetted mix. The dough is rolled, for example, to a one-eighth inch thickness and is placed in a pie plate for addition of filling before baking.

A method is disclosed in the copending application of Clyde C. Lawnicki, Ser. No. 448,279, filed concurrently herewith, for the continuous production of pastry dough using the mix described in the present application.

The following examples are illustrative of the scope of the invention and are not to be construed in any way as limiting the scope of the invention.

Example I

A pastry crust dry mix was made having the following composition:

| | Parts |
|---|---|
| Shortening | 38.5 |
| Flour containing about 14% moisture | 60.0 |
| Salt (sodium chloride) | 1.5 |

The shortening composition was made up from the following proportions of ingredients:

| | Parts |
|---|---|
| Hydrogenated cottonseed oil (I.V. equal to 8) | 7.5 |
| Cottonseed oil [1] (SCI at 70° F. equal to 22) | 10.8 |
| Soybean oil [1] (SCI at 70° F. equal to 5) | 81.7 |
| Butylhydroxyanisol | [2] 30 |
| Carotene | [2] 38 |

[1] These two partially hydrogenated ingredients comprise the base stock and together they have an SCI value at 70° F. of 6.3 and an I.V. equal to about 88.
[2] P.p.m. (based on oil mix).

The shortening composition had the following properties:

| | |
|---|---|
| SCI at 70° F. | 14.5 |
| SCI at 92° F. | 10.1 |
| SCI at 105° F. | 5.8 |
| Melting point, ° F. | 118 |
| I.V. | 83–86 |

The pastry crust dry mix was prepared with the processing apparatus depicted in FIGURE 1. With continuing reference to FIGURE 1, the shortening composition was melted by heating in stainless steel tank 12 for about 30 minutes at a temperature of 130° F. This melted shortening was allowed to flow through pipe 14. It was then pumped through pipe 18 and scraped wall heat exchanger 20. In this scraped wall heat exchanger the melted shortening was rapidly chilled to 55° F. The rapidly chilled shortening, still in liquid condition, was then pumped through pipe 22 and into one of the two hold tubes 24. Each of the hold tubes 24 was 8.5 feet long and 1.5 inches in diameter. Shortening composition flow was alternated between the two hold tubes 24, the flow being directed by valve 26. The shortening was pumped into a hold tube 24, allowed to partially crystallize at room temperature and at rest for five minutes in the hold tube and then pumped out of the hold tube over a five-minute period. The shortening composition was pumped through this shortening processing system at the rate of 1.28 pounds per minute. All pumping action in this system was supplied by gear pump 16.

As the shortening emerged from one of the two hold tubes 24 it was sliced into cylindrical slabs of one-eighth inch thickness by rotating blade 28. The slabs fell into mixer 50 described below.

High grade hard wheat flour containing about 14% moisture was premixed with salt in a ribbon mixer (not depicted) in proportions of 40:1 by weight. This salt-flour premix was fed at the rate of 2.07 lbs. per minute into the same mixer 50 with the cylindrical slabs of shortening.

The salt-flour premix was fed into mixer 50 by a flour-feeding apparatus comprising funnel-shaped hopper and sifter 30, vibrating chute 32, weighing and dumping member 34 and vibrating feeder chute 36.

Figure 2:
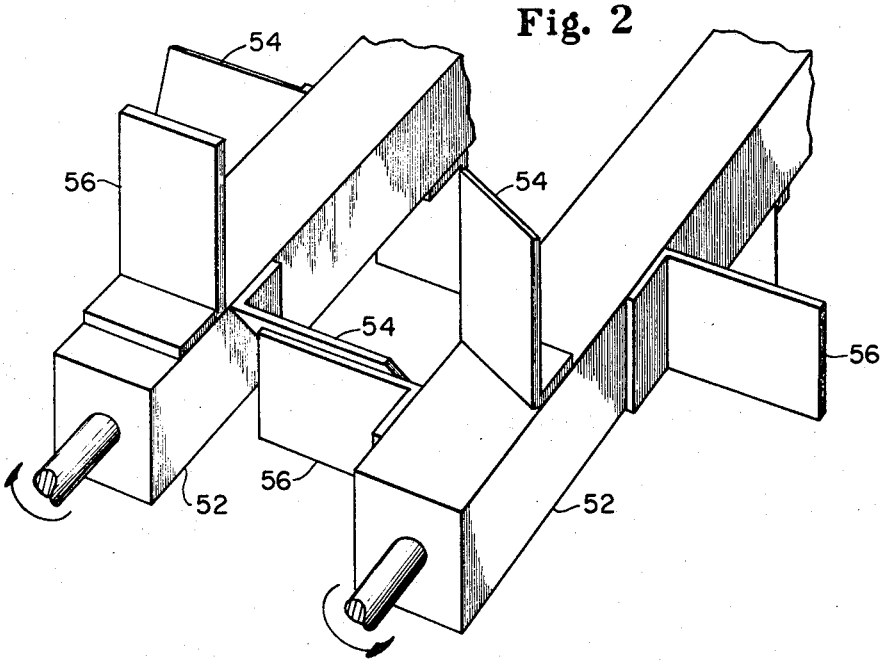
FIGURE 2 is a perspective view of a portion of the shafts and mixer blades of the high holdup continuous mixer utilized in the examples and more fully described in Example I.

The shortening and flour-salt premix were continuously fed into twin-shaft continuous shallow paddle mixer 50. The mixer was 48 inches in length. The shafts were counter-rotated each turning at a speed of 35 r.p.m. A portion of the shafts and mixer blades and the relationship of the mixer blades are shown in FIGURE 2. With reference to FIGURE 2, the shafts 52 were square. The pitched paddles 54 and the unpitched paddles 56 were located at intervals along the lengths of the shafts 52 and intermeshed between the shafts.

Referring again to FIGURE 1, in the mixer 50 all portions of the shortening and flour-salt premix were gently and grossly mixed for about 6.5 minutes.

A grossly homogeneous dry mix containing greased flour, substantially shortening-free flour and shortening lumps ranging up to about one-fourth inch in diameter resulted.

The mix emerging from the paddle mixer 50 fell into hammer mill 60, partially shown. In hammer mill 60, a Fitzpatrick "Model U Granulator," the ingredients were intensely mixed for about one second at a mill speed of 1200 r.p.m. A total of about 6000 impacts were supplied to each pound of mix.

Figure 3:
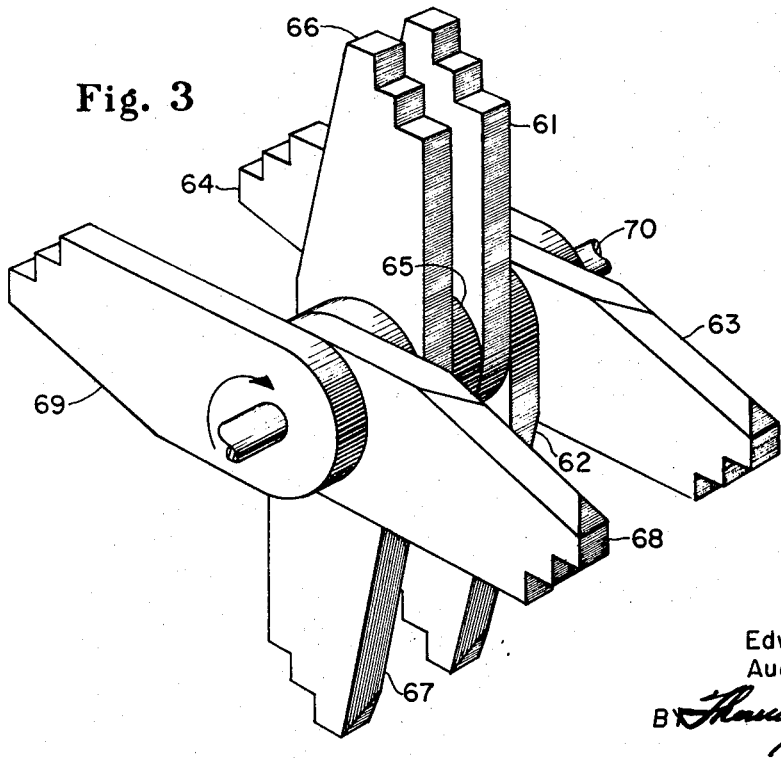
FIGURE 3 is a perspective view of a portion of the mixer blades of the high intensity low holdup continuous mixer utilized in the examples and more fully described in Example I.

A portion of the blades of hammer mill 60 and their interrelationship is shown in FIGURE 3. With reference to FIGURE 3, two sets of blades are depicted, these sets being separated by cylindrical spacer 65. One set of blades comprises blades 61, 62, 63 and 64; the other set of blades comprises blades 66, 67, 68 and 69. In hammer mill 60 there were four sets of blades. One set of blades which is not depicted abutted on blade 64; it comprised four blades positioned respectively and in the same order as blades 61, 62, 63 and 64, the abutting blade being positioned as blade 61. Similarly, the other set of blades which is not depicted abutted on blade 69; it comprised four blades positioned respectively and in the same order as blades 66, 67, 68 and 69, the abutting blade being positioned as blade 66. The trailing edge of each blade was sharpened to a knife edge, the forward edge being flat to provide impacting action and terminating in two steps. The blades were affixed to horizontally-oriented shaft 70 which rotated axially within the hammer mill.

The dry mix emerging from the hammer mill contained 40% substantially fat-free flour, 20% free shortening and 40% greased flour. Salt and moisture were calculated as part of the flour. The free shortening was present in the form of discrete lumps having diameters ranging up to about one-fourth inch.

The emerging dry mix was sprayed with liquid carbon dioxide and cooled to 50° F. The cooled mix was packaged.

The packaged mix was stored at room temperature for two days and then opened. The shortening in the mix had softened to a penetration value of 150 mm./10.

Three hundred forty grams of mix from an opened package were mixed in a bowl with 60 gms. of water to form dough. The water was added all at once and was blended into the dry mix with a fork. The mixing was kept at a minimum and was just sufficient for all the water to be absorbed.

Two hundred grams of the dough was gathered into a ball and the ball was rolled around in one gram of wheat flour on a rolling board until the ball was coated with flour. The flour-coated ball was formed into a disc by pressing it firmly into shape by hand. The disc was rolled on a rolling board with a rolling pin to form a sheet of dough about one-eighth inch thick. The sheet of dough was placed in a nine-inch pie pan and the dough was trimmed even with the pan edge with a spatula. The dough sheet was then pricked with a fork so as to expose the pie pan in several locations. The dough was then baked in a electric oven at 450° F. for 11 to 12 minutes and a golden yellow tender, flaky crust resulted.

In another case, crust was made exactly as described above from dry mix that had been stored for four weeks at 100° F. Crusts were also made with two commercially available pie crust mixes according to the directions on the packages. One of these mixes was the solid block type wherein the shortening was totally present in the greased flour (denoted as mix A hereinafter). The other mix (denoted as mix B hereinafter) was of the dry free-flowing type. The shortening in this mix comprised lard and a minor proportion of substantially completely hydrogenated lard in flake form, known as "lard flakes." The mix was prepared in a batch process in a single mixing stage with a conventional mixer.

The dry mix of this invention that had been subjected to an 100° F. storage temperature for four weeks provided an outstandingly tender crust which was substantially more flaky than the crusts from mixes A and B. Crust A tended to be mealy in its characteristics and crust B scored lower than the crust of the dry mix of this invention in both tenderness and flakiness.

Example II

A pastry crust dry mix was made by exactly the same processing steps and under the same conditions as in Example I. The mix had a composition similar to the mix of this invention described in Example I except that the shortening composition was made up from the following proportions of ingredients:

| | Parts |
|---|---|
| Hydrogenated cottonseed oil (I.V. equal to 8) | 7.0 |
| Cottonseed oil [1] (SCI at 70° F. equal to 5) | 65.4 |
| Soybean oil [1] (SCI at 70° F. equal to 22) | 27.6 |

[1] These two partially hydrogenated ingredients comprise the base stock and together they have an SCI value at 70° F. of 8 and an I.V. equal to about 88.

The shortening composition had the following properties:

| | |
|---|---|
| SCI at 70° F. | 14.5 |
| SCI at 92° F. | 10.0 |
| SCI at 105° F. | 5.8 |
| Melting point, ° F. | 118 |
| I.V. | 83 |

This dry mix provided tender, flaky crusts.

Example III

A dry mix was made as in Example I except that the shortening composition was temporarily firmed as follows: The shortening composition was melted by heating at 130° F. in a stainless steel tank for about 30 minutes. The melted shortening was rapidly chilled to 60° F. in a scraped-wall heat exchanger. The rapidly chilled shortening was allowed to partially crystallize at room temperature with mild agitation for about six minutes in a picker box. The partially crystallized shortening was cast into 3 by 6 by 12 inch molds and was tempered in the molds at 85° F. for 16 hours by storage in a constant temperature room. The tempered shortening was firmed to a penetration value of 70 mm./10 by holding in a 40° F. room until the temperature of the shortening reached 55° F. The cooled shortening was removed from the molds.

The shortening firmed as above was sliced into thin slabs one-eighth inch thick having a rectangular (three inches by six inches) cross-section. These shortening slabs were mixed with flour and salt as in Example I and the resulting mix stored at room temperature for two days.

This dry mix provided tender, flaky crusts.

Other high holdup continuous mixers such as, for example, single-shaft canted paddle mixers can replace the twin-shaft continuous paddle mixer of Example I with substantially similar results.

A filling such as blueberry filling can be placed in the panned dough sheet produced from the dry mixes of this invention prepared in the above examples and then baked to yield a pie having tender, flaky crust.

What is claimed is:
1. A process for preparing a dry, free-flowing pastry crust mix, the process comprising the following steps:
   (A) firming to a penetration value ranging from about 50 mm./10 to about 120 mm./10, a shortening composition having an SCI value at 70° F. ranging from about 12 to about 17, said firming being conducted by a process which comprises the steps of
     (1) melting the shortening composition;
     (2) supercooling the melted shortening composition to a temperature ranging from about 35° F. to about 70° F., and
     (3) allowing the supercooled shortening composition to crystallize to a condition of maximum firmness;
   (B) forming the firmed shortening into pieces having their smallest dimension not exceeding about one-half inch and having the crystalline structure of the temporarily firmed shortening composition left substantially intact;
   (C) gently and grossly mixing the shortening pieces with flour in a high holdup continuous mixer in a ratio of flour to shortening of from about 1.2:1 to about 2.3:1 for about one to about 15 minutes until the largest shortening particles range from about one thirty-second to about one-half inch in diameter; and
   (D) further mixing the mix resulting from (C) for from about one second to about five seconds in a high intensity low holdup continuous mixer until the mix comprises from about 10% to about 50% greased flour and from about 5% to about 25% shortening in the form of discrete lumps not exceeding about one-half inch in diameter; and substantially shortening-free flour.

2. The process of claim 1 wherein in step (B) the firmed shortening is sliced into thin slabs.

3. The process of claim 1 wherein the mix resulting from step (D) is immediately cooled below about 60° F.

4. The process of claim 1 wherein the shortening composition to be firmed has an SCI value at 92° F. ranging from about 8 to about 14, an SCI value at 105° F. ranging from about 4 to about 9, and I.V. ranging from about 78 to about 88 and a melting point ranging from about 115° F. to about 125° F. and the mix resulting from step (D) is immediately cooled below about 60° F.

5. The process of claim 1 wherein the shortening composition is firmed by a process comprising the following steps:

(A) melting the shortening composition;
(B) supercooling the melted shortening composition to a temperature ranging from about 35° F. to about 70° F.; and
(C) allowing the supercooled shortening composition to crystallize at room temperature, at rest, and out of contact with the supercooling medium to a condition of maximum firmness.

6. The process of claim 1 wherein the shortening composition is firmed by a process comprising the following steps:
(A) melting the shortening composition;
(B) supercooling the melted shortening composition to a temperature ranging from about 55° F. to about 70° F.;
(C) allowing the supercooled shortening composition to crystallize at room temperature in dynamic state for from about four to about eight minutes;
(D) tempering the partially crystallized shortening composition resulting from (C) herein at rest and at a temperature ranging from about 80° F. to about 90° F. for from about eight hours to about two days; and
(E) cooling the tempered shortening composition to a temperature ranging from about 35° F. to about 70° F.

7. The process of claim 2 wherein the shortening is sliced into thin slabs by a rotating blade as it is pumped from a hold tube after crystallization at rest.

8. The process of claim 1 wherein the high holdup continuous mixer is a continuous paddle mixer.

9. The process of claim 1 wherein the high intensity, low holdup continuous mixer is a variable speed impact mill.

10. The process of claim 1 wherein the supercooled shortening is allowed to crystallize on a moving belt.

References Cited

UNITED STATES PATENTS

| | | | |
|---|---|---|---|
| 2,499,586 | 3/1950 | Johnson | 99—94 |
| 2,522,591 | 9/1950 | Wilson et al. | 99—92 |
| 2,555,902 | 6/1951 | Salo et al. | 99—92 |
| 2,686,721 | 8/1954 | Callaghan et al. | 99—94 |
| 3,255,016 | 6/1966 | Parker | 99—94 |
| 3,257,213 | 6/1966 | Colby | 99—94 |

RAYMOND N. JONES, *Primary Examiner.*